(12) United States Patent
Tessiore et al.

(10) Patent No.: US 8,316,384 B2
(45) Date of Patent: Nov. 20, 2012

(54) INPUT/OUTPUT BROKER MODEL

(75) Inventors: Lorenzo Tessiore, Seattle, WA (US); Jeffrey Tzu Heng Lin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 930 days.

(21) Appl. No.: 12/372,750

(22) Filed: Feb. 18, 2009

(65) Prior Publication Data

US 2010/0211962 A1   Aug. 19, 2010

(51) Int. Cl.
*G06F 13/00* (2006.01)
(52) U.S. Cl. ........................ 719/321; 719/327
(58) Field of Classification Search ................. 719/321, 719/327
See application file for complete search history.

(56) References Cited

U.S. PATENT DOCUMENTS

| | | | |
|---|---|---|---|
| 5,680,618 A * | 10/1997 | Freund | 707/999.001 |
| 5,794,035 A | 8/1998 | Golub et al. | |
| 5,867,643 A | 2/1999 | Sutton | |
| 5,958,022 A | 9/1999 | Wilhelm, Jr. | |
| 6,219,693 B1 | 4/2001 | Napolitano et al. | |
| 6,581,054 B1 * | 6/2003 | Bogrett | 707/999.003 |
| 2003/0097581 A1 | 5/2003 | Zimmer | |
| 2007/0094673 A1 | 4/2007 | Hunt et al. | |
| 2010/0153874 A1 * | 6/2010 | McKinney | 715/781 |

OTHER PUBLICATIONS

Kougiouris, Panagiotis. "A Device Management Framework for an Object-Oriented Operating System", pp. 81.
Hagen, William Von, "Migrating to Linux kernel 2.6", Feb. 13, 2004, pp. 6.
"VxWorksr", VxWorks Device Driver Developer's Guide, vol. 1: Fundamentals of Writing Device Drivers, 6.6, Nov. 9, 2007, pp. 146.
Spear, et al., "Solving the Starting Problem: Device Drivers as Self-Describing Artifacts", EuroSys'06, Apr. 18-21, 2006, pp. 45-58.
Kougiouris, Panagiotis. "A Device Management Framework for an Object-Oriented Operating System", M.S. Thesis, Department of Computer Science, University of Illinois at Urbana-Champaign; 1991; pp. 81.

* cited by examiner

*Primary Examiner* — Andy Ho (57) ABSTRACT

The described implementations relate to input/output (I/O) broker models for use with various devices. One implementation can dynamically match an I/O request to a suitable I/O driver. This implementation can also determine a buffering strategy for accomplishing the I/O request based, at least in part, on information obtained from the I/O driver.

20 Claims, 6 Drawing Sheets

INPUT/OUTPUT BROKER MODEL

BACKGROUND

Computer-related technologies continue to be manifest in ever-increasing types of computing devices (hereinafter, "devices"). Newer examples of such devices can include smart phones, wrist watch cell phones, and smart appliances, just to name a few. Of course, these examples offer just a snap-shot of evolving devices. A common thread among these devices is that they often perform some type of input/output (I/O) function as data is moved and/or manipulated.

Traditional devices employ a very specific architecture. First, an operating system (OS) is developed for a specific hardware processor. Then applications and drivers are developed for the OS. The OS pre-defines how I/O functions are performed involving the applications and drivers. This traditional paradigm has many advantages, but does not necessarily lend itself to quickly evolving devices where new processors and/or combinations of components are readily adopted. Alternatively or additionally, predefining how I/O functions are to be handled tends to limit consideration of runtime conditions. The present concepts relate to an I/O broker model that can supplant or augment a traditional OS and is readily adaptable to various hardware configurations.

SUMMARY

The described implementations relate to input/output (I/O) broker models for use with various devices. One implementation can dynamically match an I/O request to a suitable I/O driver. This implementation can also determine a buffering strategy for accomplishing the I/O request based, at least in part, on information obtained from the I/O driver.

Another implementation can receive an I/O request from a managed application, wherein the I/O request includes a namespace. The implementation can identify an I/O driver to handle the I/O request based upon the namespace and obtain information about the I/O driver regarding buffering strategy. The implementation can create a buffer based upon the buffering strategy.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the Figure and associated discussion where the reference number is first introduced.

DETAILED DESCRIPTION

Overview

This patent application relates to input/output (I/O) broker models between applications and drivers for accomplishing I/O functions. The I/O broker model can offer potential advantages to either or both of the applications and the drivers.

For instance, the I/O broker model can define an I/O request naming convention for use by the applications that allows the applications to be relatively independent and unaware of the underlying hardware configuration. Stated another way, the I/O broker model can enable the same application to be used with different hardware configurations. Similarly, the I/O broker model can obtain information about the drivers that allows the I/O broker model to match an I/O request to a suitable driver on behalf of the application. Further, the I/O broker model can obtain information from the suitable driver about how to handle buffering for the I/O request. Allowing the driver to specify the buffering strategy can save buffering resources and/or speed execution of the I/O function. For example, if the driver can handle the buffering, then the processing speed and/or resource usage can be improved by avoiding needlessly copying the data to a shared buffer or an application buffer.

Figure 1:
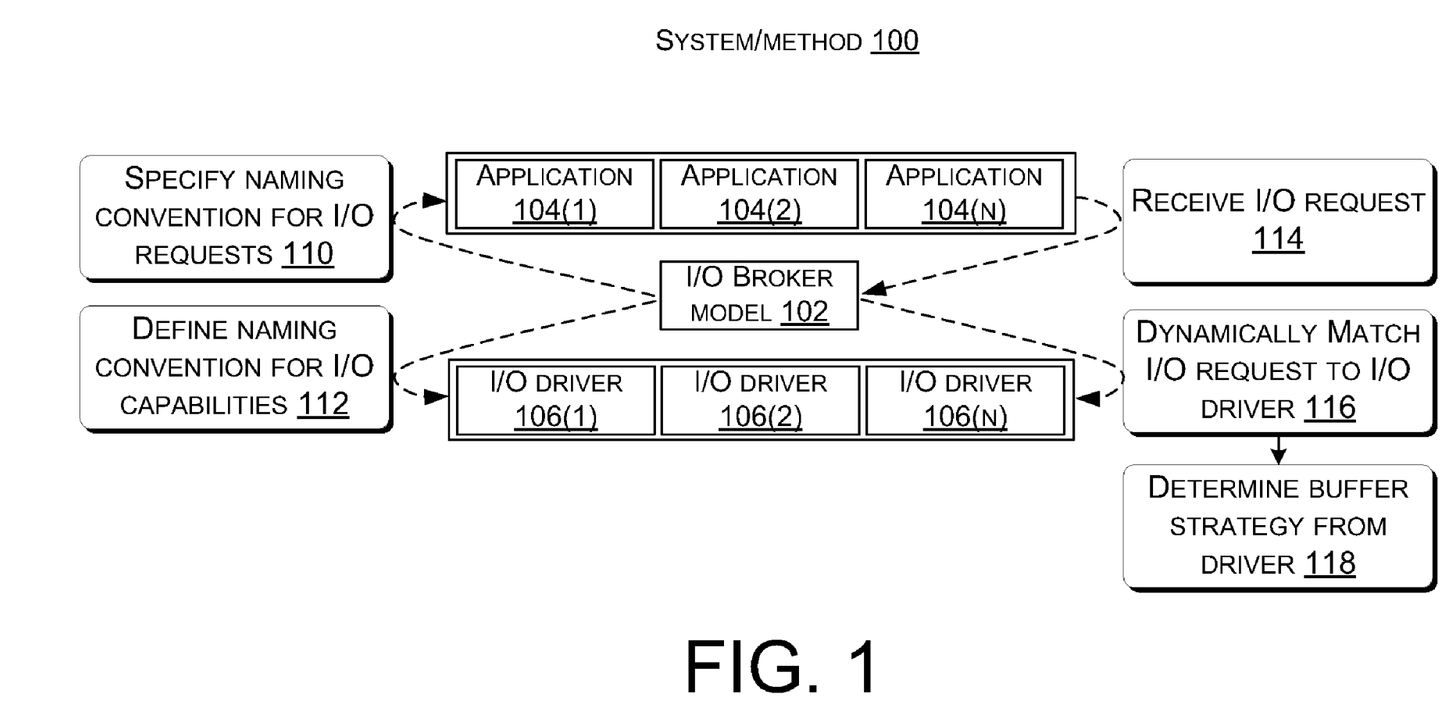
FIG. 1 shows an example of a system/method 100 for implementing I/O broker concepts in accordance with some implementations of the present concepts.

FIG. 1 offers an introductory example of some of the present concepts in the form of a system/method 100. In this case, system/method 100 includes an I/O broker model 102 operating between applications 104(1), 104(2), and 104(N) and I/O drivers 106(1), 106(2), and 106(N). I/O broker model 102 can specify a naming convention for I/O requests at 110. Examples of naming conventions are described in more detail below in relation to FIG. 2, but briefly, the I/O naming convention can include a namespace and an endpoint. In one configuration, the namespace can include a transport identifier (hereinafter, "transport") and/or a protocol identifier (hereinafter, "protocol"). For instance, a transport might be a universal serial bus (USB) port. A protocol might be HTTP. The endpoint can specify particular data or content (i.e., a file associated with the namespace). So for instance, for a given I/O request, if the namespace is "FLASH1" and the endpoint is "foo.txt" then the I/O request relates to reading or writing data from the "foo" file at Flash device number one.

The I/O broker model 102 model can also specify a naming convention for I/O capabilities of I/O drivers at 112. The naming convention for the I/O capabilities can convey the ability of the I/O driver to handle these same namespaces (i.e., transports and/or protocols). For example, the naming convention can allow an I/O driver to specify that it handles a "FLASH1" I/O device.

Subsequently, I/O broker model 102 can receive an I/O request from one of applications 104(1)-104(N) consistent with the I/O request naming convention. The I/O broker model can match the I/O request to an I/O driver 106(1)-106(N) based upon the namespace information of the I/O request. So, for example, if the I/O request is for "FLASH1 ... foo.txt" then the I/O broker model can select the I/O driver 106(1)-106(n) that has identified its capabilities as handling the hardware "FLASH1".

I/O broker model 102 can determine a buffer strategy for accomplishing the I/O request, at least in part, from information obtained from the matched or selected driver at 118. Allowing the I/O driver to influence buffering strategy can increase and even optimize system performance as will be explained below relative to FIG. 2.

Example of a System Configuration

Figure 2:
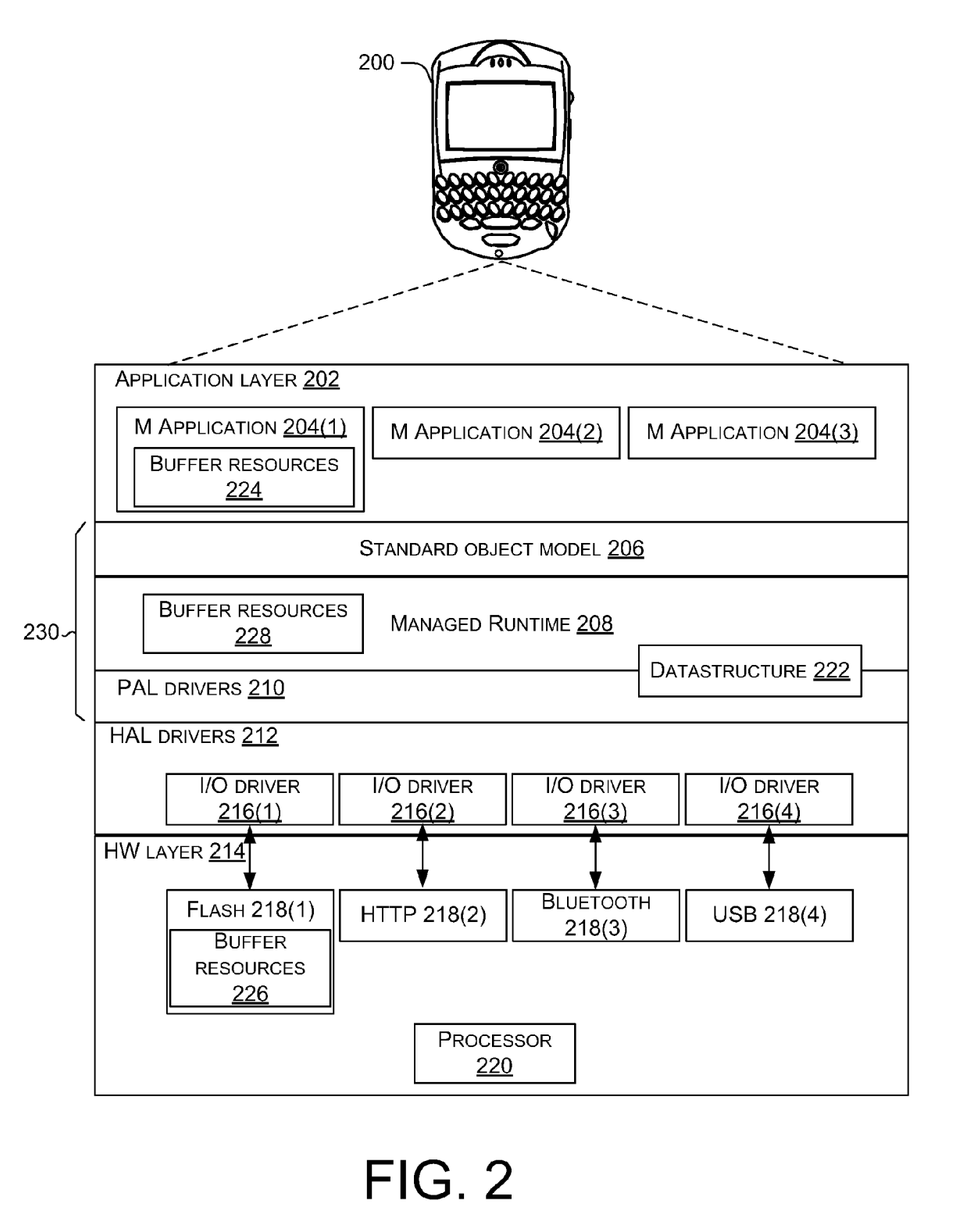
FIG. 2 illustrates an example of a device and associated architecture for accomplishing I/O brokering in accordance with some implementations of the present concepts.

FIG. 2 shows a computing device (hereinafter, "device") 200 that is but one example upon which the above mentioned I/O broker model can be implemented. In this instance, device 200 is manifest as a cellular/smart phone. The present concepts can be applied to many other devices, such as personal computers. Perhaps most notably the present concepts can be applied on resource-constrained devices, such as personal digital assistants (PDAs), cameras, headsets, media players, cell phones, multifunction wristwatches, smart appliances, and vehicles, among other ever-evolving types of devices. In some implementations, devices can be resource-constrained in terms of memory, such as for code size and/or run time memory. The term "device" is used broadly to encompass a component of the device or the overall device. For instance, the device can be an embedded system which performs I/O brokering on a cell phone and/or the cell phone that incorporates the embedded system.

In this case, device 200 includes an application layer 202 upon which managed applications 204(1), 204(2), and 204(3) can operate. Application layer 202 is abstracted over a standard object model 206 that operates on top of a managed runtime component 208. Platform abstraction layer (PAL) driver layer 210 and hardware abstraction layer (HAL) driver layer 212 operate between the managed runtime component 208 and a hardware layer 214.

In this instance, four I/O drivers 216(1), 216(2), 216(3), and 216(4) are shown in HAL driver layer 212. I/O driver 216(1) is the driver for a flash memory device 218(1). I/O driver 216(2) is the driver for HTTP protocol 218(2). I/O drivers 216(3) and 216(4) are the drivers for Bluetooth device 218(3) and USB port 218(4), respectively. Hardware layer 214 can include, or operate on top of, a processor 220. Further, a datastructure 222 can store information about I/O drivers 216(1)-216(4). While specific numbers and types of components are listed for purposes of example, the skilled artisan should recognize that the present concepts lend themselves to other configurations, including the number and types of applications, I/O drivers and/or hardware layer components.

Various buffering resources can be available on device 200. In the illustrated configuration, application 204(1) has buffering resources 224, but applications 204(2) and 204(3) do not. Similarly, I/O driver 216(1) is associated with flash hardware device 218(1) which has buffering resources 226 while the remaining hardware devices 218(2)-218(4) do not have buffering resources. Further, shared buffering resources 228 are associated with managed runtime component 208. While shown with managed runtime component 208, buffering resources 228 may be provided by processor 220. At some points in the discussion, standard object model 206, managed runtime component 208, PAL drivers 210 and datastructure 222 may be referred to as a "microframework" 230.

In device 200 managed runtime component 208 and/or microframework 230 can provide the I/O broker model introduced in relation to FIG. 1. In this case, microframework 230 can provide two extensibility features to accomplish the I/O broker model. The first extensibility feature is offered relative to the managed applications 204(1)-204(3). The second extensibility feature is offered relative to the I/O drivers 216(1)-216(4). Briefly, in some implementations, the first extensibility feature can define an I/O request naming convention for use by managed applications 204(1)-204(3) so that I/O requests from the managed applications include a namespace portion and an endpoint portion. Further, the second extensibility feature can specify an I/O driver naming convention that allows the I/O drivers 216(1)-216(4) to identify a namespace handled by the I/O driver. The identified namespaces can be used in selecting a suitable driver to accomplish an I/O request.

The two extensibility features can allow applications 204(1)-204(3) to be generic relative to the underlying hardware of hardware layer 214. For example, on one device with a hypothetical hardware configuration 'A', a given namespace and endpoint may mean one thing, while on another device with a different hardware configuration 'B', the same endpoint may mean something else. With the two extensibility features offered by the microframework 230, the applications 204(1)-204(3) do not need to know about the underlying hardware configuration.

The second extensibility feature can define how I/O drivers describe their capabilities (i.e., how I/O drivers describe the namespace they serve). In one implementation, microframework 230 can find the I/O driver responsible for an I/O request based on a naming convention for the I/O endpoints enforced at the object model level. The microframework 230 can also allocate the memory based on the capabilities of the I/O drivers and the underlying hardware, thus avoiding useless memory copies at the application level and eventually taking advantage of the hardware's own memory buffers for reduced memory and processor consumption.

To summarize, the second extensibility feature can let the I/O driver programmer choose a suitable, and potentially the best I/O model for the I/O device at hand. In one configuration, each I/O driver is registered with the microframework 230 under a well defined naming convention that allows the microframework to locate which I/O driver 216(1)-216(4) should handle which namespace/endpoint. For instance, managed runtime component 208 can call the I/O drivers to self-register at boot-up. The self-registration information can then be stored in datastructure 222. For example, the self-registration information might include the hardware supported by the I/O driver, the type of buffering the I/O driver can support, and/or the size and location of those buffers and who is going to manage those buffers.

In some configurations, once an I/O driver (216(1)-216(4)) is selected for the I/O request, the microframework 230 can query the selected I/O driver regarding buffering strategy. The microframework can automatically handle the buffering needs of the I/O driver by letting the I/O driver take care of providing the memory, allocating the memory on behalf of the I/O driver, or letting the application use its own memory directly. Such a configuration can allow the device 200 to handle both synchronous and asynchronous I/O functions.

In some implementations, memory can be handled in a managed heap memory manner, except when it is the memory provided by the I/O driver. Accordingly, the microframework 230 can automatically take care that no garbage collection or compaction activity interferes with the ability of the I/O driver, the microframework and/or the managed application to access or modify the data memory at any given time in a safe way.

The microframework 230 can achieve the above result by pinning the memory in the managed heap during asynchronous I/O when the managed application provides the memory and by unpinning the memory upon completion. Also the microframework can allocate unmovable memory for asynchronous I/O when the microframework utilizes a microframework buffered I/O (i.e., buffering resources 228).

Utilizing the microframework 230 to buffer I/O functions can be convenient for I/O devices that have fixed buffering requirements, such as block storage drivers that do need to read data by a fixed size. Application buffered I/O functions can be convenient to minimize the memory usage when the underlying I/O drivers can read data in variable quantities. Driver buffered I/O can be convenient when the underlying hardware can provide physical buffers.

In summary, microframework 230 offers several potential advantages that are explored in more detail below. Briefly, one potential advantage can be that the microframework 230 can allow flexibility in I/O driver design. For instance, I/O drivers can be implemented in various different ways depending on the underlying hardware. For example, I/O drivers can be configured that have their own memory for buffering or an I/O driver can rely on shared buffers. Further, the microframework 230 can increase and even optimize run-time efficiency. This can potentially achieve the best obtainable performance because the I/O driver can select the buffering strategy depending on the runtime conditions. For instance, even if an I/O driver has buffering resources, those buffering resources may be unavailable at runtime so the I/O buffer can instruct the microframework to obtain other buffering resources rather than waiting for the I/O driver's buffering resources to clear. In contrast, existing configurations mandate that I/O drivers always run the same way (i.e., an I/O driver that has buffering resources must always use those resources without consideration of their current state).

Microframework 230 offers design flexibility to I/O driver developers depending on the underlying hardware. For instance, I/O driver developers can make powerful fast drivers (i.e., drivers with their own dedicated buffering resources) or simple drivers that utilize buffering resources available to the microframework.

Viewed another way, a developer writing an I/O driver for a given piece of hardware operating on a particular processor is generally in a good position to decide the buffering strategy for the new I/O driver since he/she knows the properties of the driver. The present implementations can allow the driver developer to specify how to handle its buffering. Further, some implementations allow the driver to decide the buffering strategy dynamically at run time. For instance, assume that an I/O request is directed by the microframework 230 to I/O driver 216(1) which has its own buffering capacity via the buffer resources 226 of flash 218(1). However, assume that at runtime buffering resources 226 are already dedicated to another operation (i.e., unavailable). In this scenario, the managed runtime component can query the I/O driver 218(1). Rather than indicating that it can handle the associated buffering for the I/O request, the I/O driver 218(1) can tell the microframework 230 to handle the buffering requirements for the I/O request. This can reduce the execution time of accomplishing the I/O request when compared to waiting for the driver's buffering resources to become available.

While device 200 functions without an operating system (OS), the microframework 230 can be employed on top of an OS. With the microframework on top of the OS, the OS can run the hardware and have an I/O driver to do file streaming that already takes care of the buffering. In such a configuration, the microframework can interact with the applications to implement the stream interface for the I/O driver selected by the OS. Regardless, the microframework 230 can still make a better decision on how to handle a given scenario that the traditional predefined buffering strategies.

Without the microframework 230, the OS is preconfigured in how it handles a given driver or there is a handshake between the managed application and the I/O driver where the driver is essentially implemented on the managed application. Such a configuration adds a great deal of complexity to the managed application. Instead, here the microframework 230 can handle business for the managed application so that the managed application can remain very simple. Thus, this implementation can keep overhead low for managed applications by offering a flexible, adaptable, low-overhead microframework that operates between the managed applications and the I/O drivers.

In one configuration that is now discussed in greater detail, the first extensibility feature can be enabled by offering a consistent set of stream oriented classes in the standard object model 206. This configuration can allow the application developer to use the consistent set of stream oriented classes to control a sequence of I/O functions. This extensibility feature can allow the application developer to create portable code that potentially works for every device and transport without worrying about how to optimize the memory usage on a case-by-case situation when either the underlying hardware or I/O drivers change.

In this configuration, I/O functions can relate to file streams. In this case a file stream request naming convention defines a path with the following structure: '\<NAMESPACE>\[<qualifier>=1::N]\<endpoint>'. Any number of qualifiers can be used. A typical path for a file system entry would look like '\SD1\dir1\dir2\foo.txt'. This path uniquely identifies the endpoint 'foo.txt' in the search path 'dir1\dir2' as being accessed by the I/O driver that owns the namespace 'SD1'. The microframework 230 can locate the driver entry (such as in datastructure 222) and verify what file system (i.e., hardware 218(1)-218(4)) is connected to that namespace and use it to locate the endpoint in the search path. After locating the file, the microframework can use the stream I/O driver to read and write data. Another valid path would be '\COM1' and could be used to locate a serial port (not shown). The same infrastructure can be used to optimize buffering and take advantage of asynchronous services offered. In this case the serial port stream driver will not associate to any file system. The microframework 230 can recognize that no file system is provided for the serial port and just move the data in and out without applying any additional formatting or changing any other file system entries. This implementation is described in more detail below.

Described another way, creation of a file stream entails creating an object that will use a stream interface that loosely couples a managed application and an I/O driver. The microframework 230 provides a naming convention that allows this coupling to occur via the naming conventions described above. The naming convention can allow the managed runtime component to open a file stream that goes to the correct driver. The stream interface is specified in the name of the file that is being opened and the file name is defined in the naming convention. For instance, the naming convention can specify that \com1\foo.txt, \USB 2\foo.txt, and \FLASH1\foo.txt are three different files that go to three different end points by way of three different drivers that have the same stream interface. The microframework 230 can use those names and open a file stream for each of the names. From the perspective of the managed application, the file stream object is the same for all three, yet what happens in hardware is different.

Figure 3:
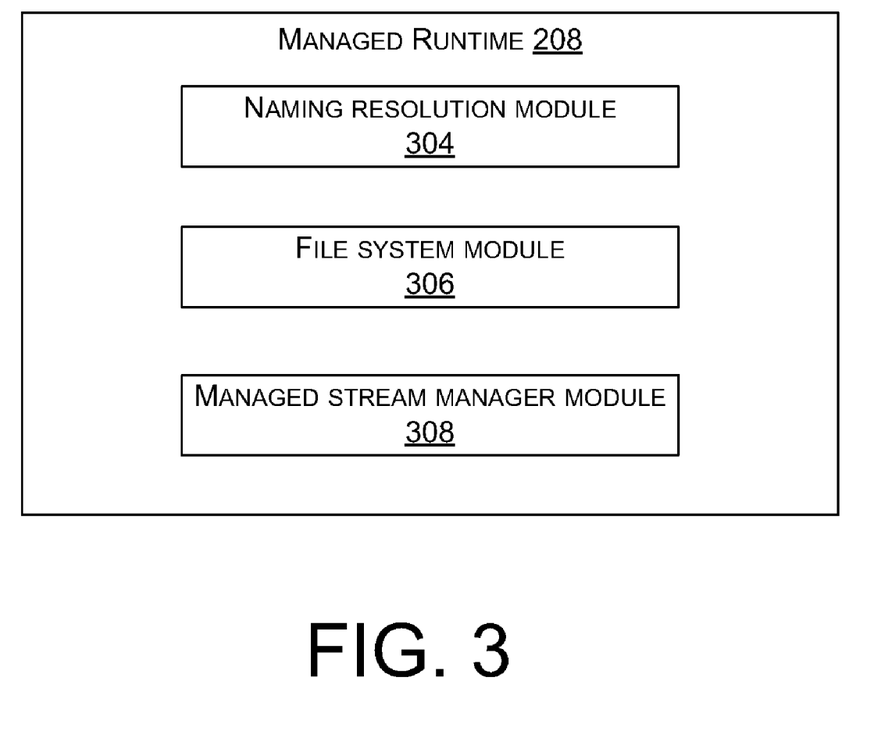
FIG. 3 illustrates an example of components for accomplishing I/O brokering in accordance with some implementations of the present concepts.

FIG. 3 shows an example of logic modules of managed runtime component 208 for accomplishing I/O brokering. In this case, the logical modules are manifest as a naming resolution module 304, a file system module 306, and a managed stream manager module 308.

The naming resolution module 304 can define a naming convention for either, or both, of managed applications and/or I/O drivers described in relation to FIG. 2. For instance, the naming convention can indicate that an I/O request (in some cases a file stream request) follows a convention that includes a namespace and an endpoint. Similarly, the naming convention for the I/O drivers can serve to identify which hardware is handled by which drivers.

The file system module 306 can maintain current file streams. It can cause new file streams to be reserved and existing file streams to be unreserved when they are no longer needed.

The managed stream manager module 308 can manage individual file streams. For instance, the managed stream manager module can identify an I/O driver for accomplishing the file stream. The managed stream manager can also manage the buffering process for the file stream. For example, the managed stream manager can identify a buffering strategy for the I/O driver, such as by querying the I/O driver about the buffering strategy. The managed stream manager can then create or otherwise reserve buffer resources consistent with the buffering strategy, if needed. For instance, if the buffering strategy involves the use of shared buffering resources, then the managed stream manager can reserve those resources on behalf of the file stream.

Functions that can be performed by the naming resolution module 304, file system module 306, and managed stream manager module 308 are described in more detail below by way of example.

First Method Example

Figure 4:
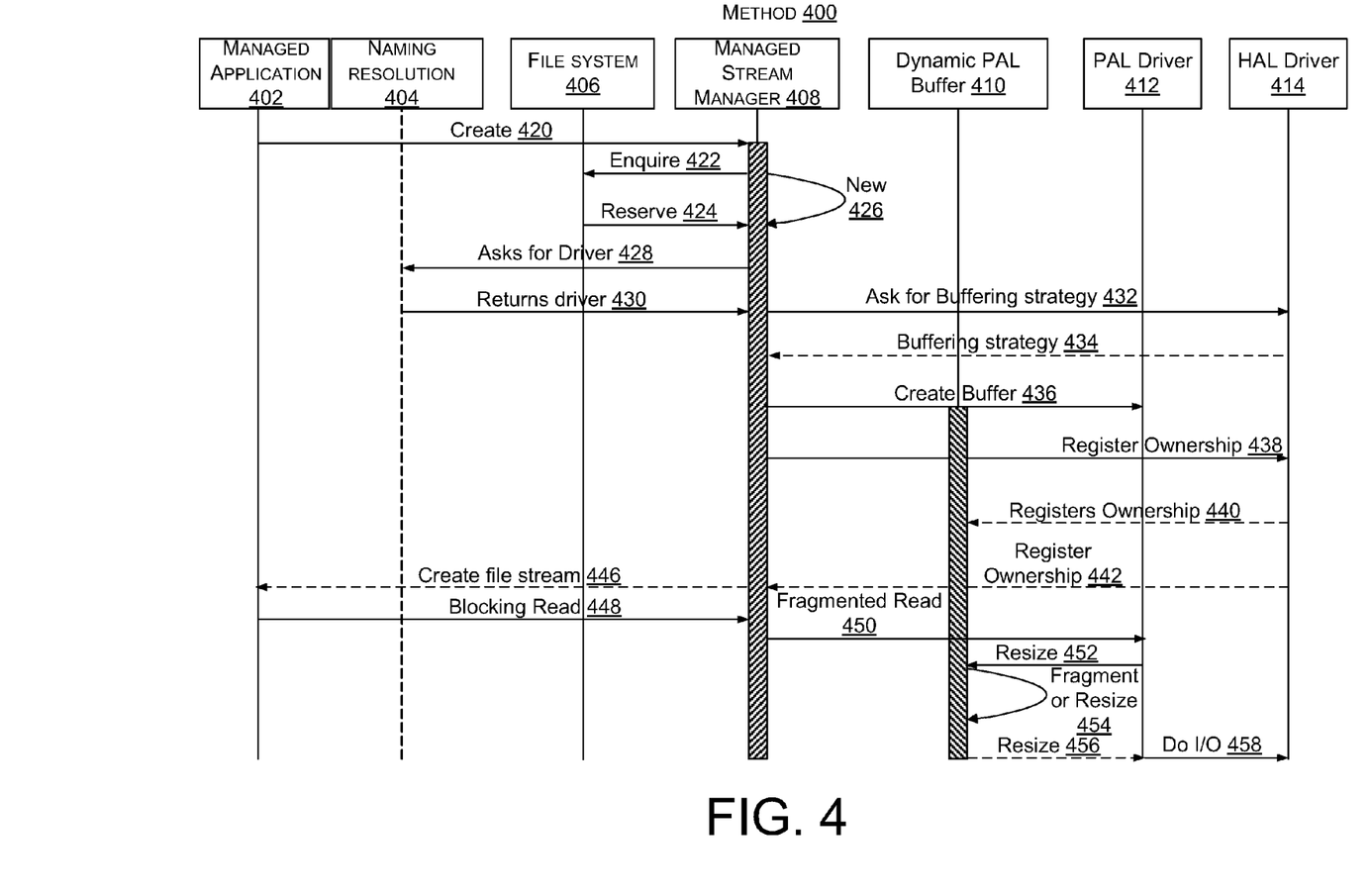
FIGS. 4-5 illustrate an example of a flowchart of an I/O brokering method in accordance with some implementations of the present concepts.
Figure 5:
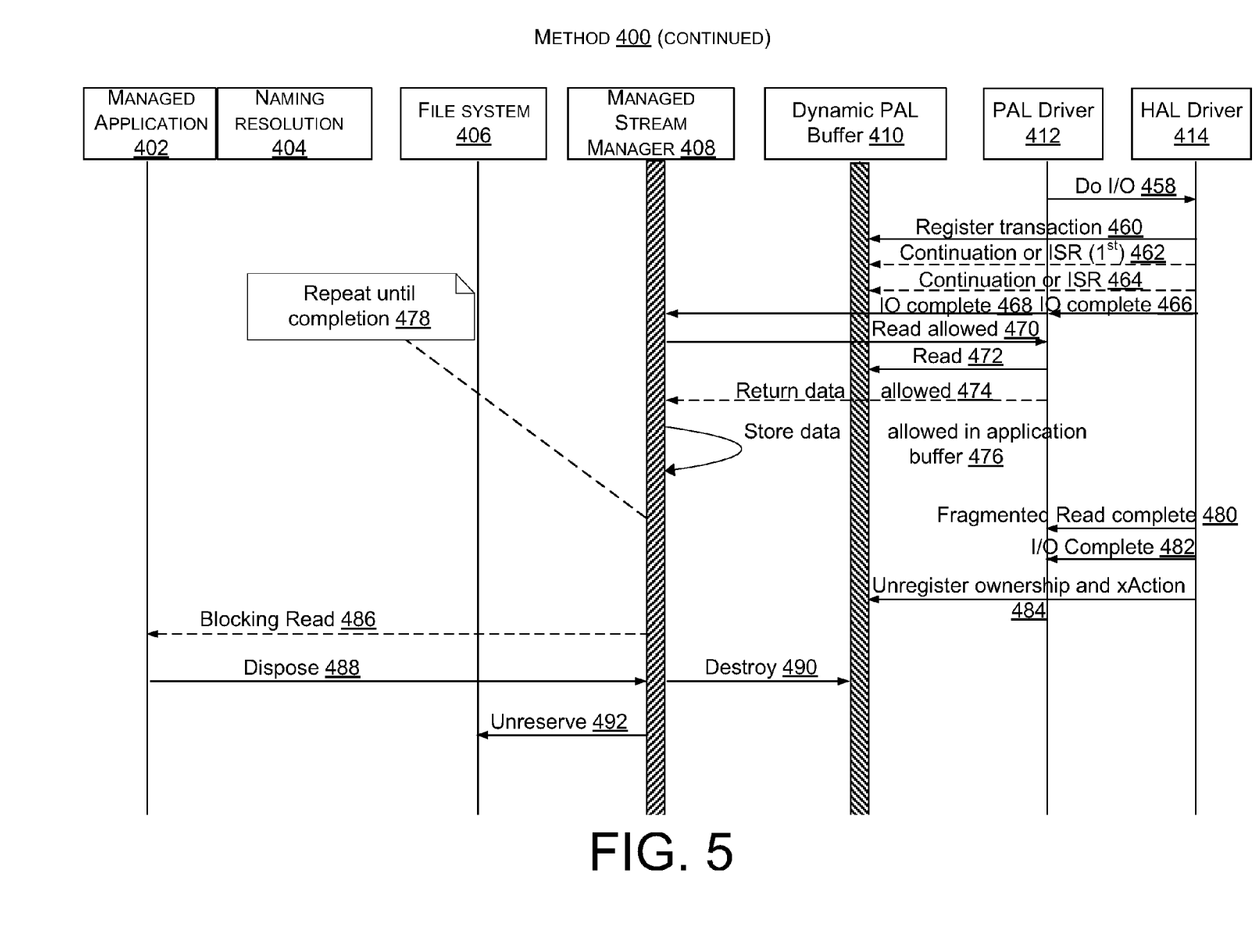

FIGS. 4-5 collectively show a method 400 of I/O brokering. For purposes of explanation, the I/O brokering method is described in relation to some of the components described above in relation to FIGS. 2-3. However, the skilled artisan should recognize that the method can alternatively or additionally be performed by other components. In this case, method 400 can be performed by a managed application 402, a naming resolution module 404, a file system module 406, a managed stream manager module 408, a dynamic PAL buffer 410, a PAL driver 412, and a HAL driver 414. Naming resolution module 404, file system module 406, and managed stream manager module 408 can be provided by the managed runtime component described above in relation to FIGS. 2-3.

I/O buffering method 400 relates to a particular scenario where shared buffering resources are utilized to handle an I/O request. Similar methods can relate to driver buffered and application buffered scenarios.

At 420, the method begins with a file stream request that conforms to the above described naming conventions. Stated another way, in this case, managed application 402 requests creation of a file stream.

At 422, the method enquires whether a file stream already exists that has the same namespace and endpoint. In this instance, block 422 is performed by the managed stream manager module 408 which enquires with the file system module 406. If no conflict exists, then the file system module reserves the requested file stream at 424, and the managed stream manager module 408 creates the new file stream request at 426. In summary, blocks 422-426 check for conflicting file streams and secure a file stream corresponding to the file stream request if no conflicts exist.

The method asks for a HAL driver to perform the file stream request based upon the namespace at 428. In this configuration, the managed stream manager module 408 module asks the naming resolution module 404 for the HAL driver. As mentioned above, the I/O drivers (in this implementation is HAL drivers 414) may have previously registered their capabilities with the naming resolution module 404 according to the naming convention.

The method returns a driver (i.e., HAL driver 414) that is suitable for handling the namespace at 430. In this particular case, the naming resolution module 404 returns the driver to managed stream manager module 408. The managed stream manager module then asks the HAL driver for a buffering strategy at 432. HAL driver 414 provides a buffering strategy at 434. The buffering strategy can be based upon the buffering resources available to the HAL driver and the present state of those buffering resources, among other considerations. For example, the returned buffering strategy can take into account whether the HAL's buffering resources are available or reserved (i.e., busy). For discussion purposes assume that in this example, the buffering strategy involves utilizing system buffering resources.

The method can create a buffer corresponding to the buffering strategy at 436. In this case, the managed stream manager module handles the buffer creation. The method then registers the ownership of the created buffer with HAL driver 414 at 438. The HAL buffer then registers ownership of the buffer resources with the dynamic PAL buffer 410 at 440 and with the managed stream manager module at 442. In summary, blocks 436-440 provide the location of the buffer to the HAL driver so that the HAL driver can then write the data to the buffer. Traditionally, the HAL driver would write the data into its own buffer and then the data would be copied into the shared buffer. The present configuration allows the HAL driver to instead write directly into the reserved shared buffer.

The managed stream manager module 408 creates the file stream at 446. Stated another way, at this point the file stream is created that corresponds to the file stream creation request of block 420. A blocking read is performed by managed application 402 at 448.

At this point, the managed stream manager module 408 is aware of how much buffering resources are available for the data stream. Often the buffering resources that are available are less than the overall amount of data, so the buffering operation can be performed in chunks in an asynchronous manner. The managed stream manager module 408 can handle this process in a manner that is blind to the HAL driver 414 and/or the managed application 402. Specifically, the managed stream manager module 408 can start a fragmented read at 450. The PAL driver 412 can resize the read at 452. In summary, the PAL driver 412 can be thought of as managing movement of chunks of data from the HAL driver 414 to the shared buffer. Specifically, data can be fragmented or resized at 454 within dynamic PAL buffer 410. The dynamic PAL buffer then resizes the read data at 456. The PAL driver 412 accomplishes the I/O function at block 458. (Due to space constraints the illustrated method transitions to the top of FIG. 5 where block 458 is repeated for continuity).

The method registers a transaction at 460 between the HAL driver 414 and the dynamic PAL buffer 410. At 462, a first continuation or interrupt service routine (ISR) occurs. This process is repeated until complete ('N' times) as indicated at 464.

The I/O function is completed at 466 between the PAL driver 412 and the HAL driver 414 and between the HAL driver and the dynamic HAL driver buffer 410 as indicated at 468.

The read function is allowed by the managed stream manager module 408 at 470. The read function is performed at 472 from the PAL driver 412 to the dynamic HAL buffer 410. Return data is allowed at 474 between the HAL driver 414 and the managed stream manager module 408. A store data command is allowed in the managed stream manager at 476. The above method is repeated at 478 until the data is stored which occurs when the fragmented read is completed at 480. At 482, the I/O function is completed. The method unregisters ownership and X action at 484 since the write operation is complete. At this point the data is available for the managed application 402 which initially requested creation of the file stream.

A blocking read is accomplished between the managed application 402 and the managed stream manager module 408 at 486. The managed application indicates that the file stream can be disposed at 488. A destroy command is issued by the managed stream manager module 408 at 490 to the dynamic PAL buffer 410. At 492, the managed stream manager module 408 un-reserves the file stream (that was reserved at 424) to complete the method.

As mentioned above, method 400 is directed to a scenario that involves creation of an intermediate system buffer to manage the I/O function. In another scenario, the managed application supplies the buffer. In that scenario, the HAL driver can write directly to the application buffer. Still another scenario is the driver buffered scenario, where the I/O driver uses its own buffer so no other buffer resources are allocated for the file stream.

Figure 6:
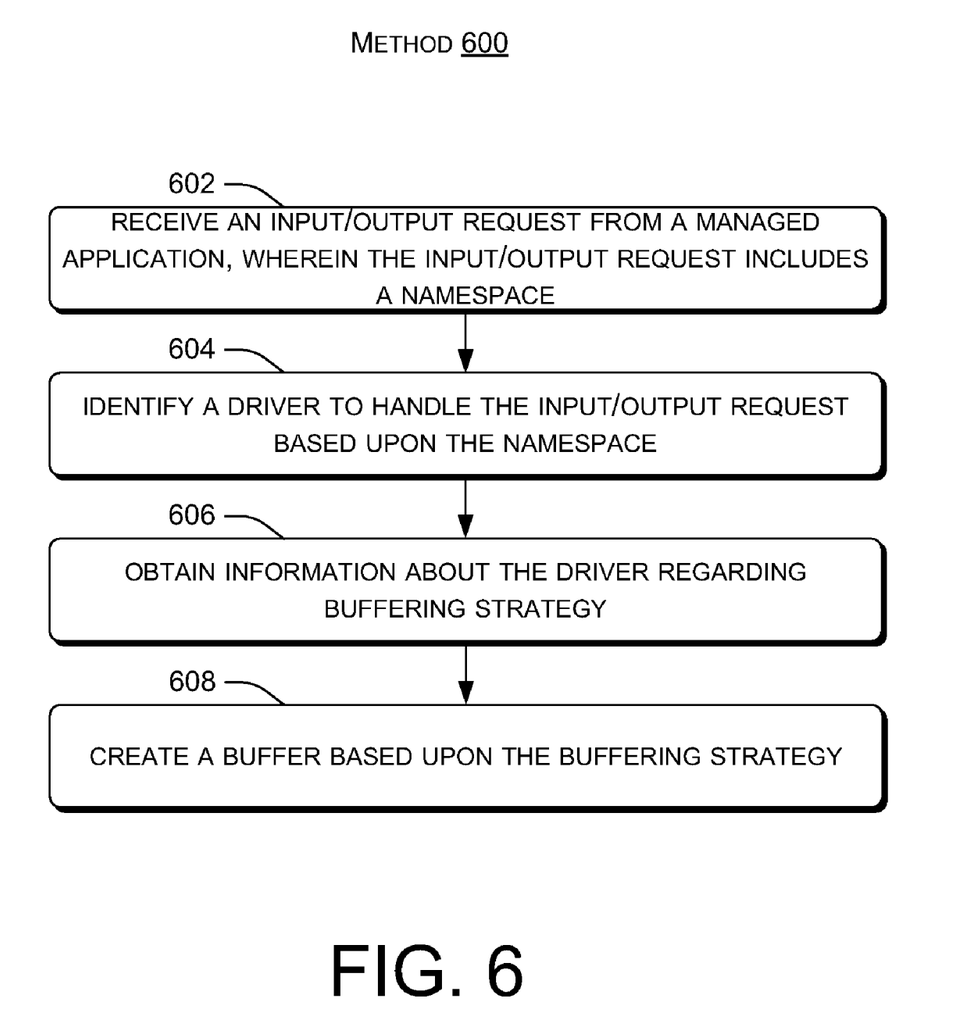
FIG. 6 is an example of a flowchart of an I/O brokering method in accordance with some implementations of the present concepts.

Method 400 is presented at a fairly detailed level and for purposes of explanation is presented in relation to logic modules that can accomplish the method. FIG. 6 broadly describes points of interest in another method that relates to the present concepts.

Second Method Example

FIG. 6 illustrates a flowchart of a method or technique 600 that is consistent with at least some implementations of the present concepts. The order in which the method 600 is described is not intended to be construed as a limitation, and any number of the described blocks can be combined in any order to implement the method, or an alternate method. Furthermore, the method can be implemented in any suitable hardware, software, firmware, or combination thereof, such that a computing device can implement the method. In one case, the method is stored on a computer-readable storage media as a set of instructions such that execution by a computing device causes the computing device to perform the method.

At block 602, the method receives an I/O request from a managed application. The I/O request includes a namespace. In one configuration, the namespace can include a transport and/or a protocol. The I/O request can be any type of request to read or write data from one location to another.

At block 604, the method identifies a driver to handle the I/O request based upon the namespace. The identified driver can handle the transport or protocol of the namespace. For instance, if the namespace includes a USB transport, then the identified driver can handle data transmission over the USB port. In some instances, information used to identify the suitable driver can be obtained directly from the drivers themselves. In other instances, an indication of a suitable driver may be obtained from an repository of driver information. For instance, the datastructure described above in relation to FIG. 2 can contain information from the various drivers and can provide an indication of a suitable driver for the namespace.

At block 606, the method obtains information about the driver regarding buffering strategy. The information can be obtained directly from the driver or indirectly, such as from a datastructure that contains information about the driver. The information can include or relate to the capabilities of the driver (i.e., whether the driver has buffering resources). Buffering strategy often includes the use of the driver's buffering resources, shared buffering resources, or buffering resources of the managed application. The information can also include run-time information about conditions relating to the driver. For instance, the information can relate to whether the driver's buffering resources are available or busy.

At block 608, the method creates a buffer based upon the buffering strategy. Buffer creation can entail reserving buffering resources for the I/O function. As mentioned above, the buffering resources may be shared (i.e., system) buffering resources, buffering resources associated with the driver, or buffering resources associated with the managed application. If the driver's buffering strategy is to self-buffer and those buffering resources are available, then the buffer creation can involve reserving the driver's buffering resources. If the driver's buffering resources are unavailable then the creating can entail reserving other buffering resources.

The above described method can free the managed application from being tied to the underlying hardware configuration. Further, the method can allow flexibility in driver design to fit a particular scenario rather than requiring uniformity of hardware and driver configurations. Further still, run-time efficiency can be increased by allowing the driver to influence buffering strategy since the driver has useful information regarding current buffer usage and hence potential delay.

CONCLUSION

Although techniques, methods, devices, systems, etc., pertaining to I/O broker models are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A hardware computer-readable storage media having instructions stored thereon that when executed by a computing device cause the computing device to perform acts, the acts comprising:
    receiving an input/output request from a managed application, wherein the input/output request includes a namespace;
    identifying a driver to handle the input/output request based upon the namespace;
    obtaining information about the driver regarding buffering strategy; and,
    creating a buffer based upon the buffering strategy.

2. The hardware computer-readable storage media of claim 1, wherein the receiving comprises receiving the input/output request from the managed application, wherein the managed application generated the input/output request according to a naming convention that includes the namespace and an endpoint.

3. The hardware computer-readable storage media of claim 2, wherein the namespace includes a protocol and a transport.

4. The hardware computer-readable storage media of claim 1, wherein the identifying comprises dynamically obtaining a listing of drivers associated with the namespace.

5. The hardware computer-readable storage media of claim 1, wherein the obtaining comprises obtaining the information directly from the driver.

6. The hardware computer-readable storage media of claim 1, wherein the information indicates whether the driver can provide the buffer.

7. The hardware computer-readable storage media of claim 1, wherein the creating comprises relying on the driver to create the buffer, instructing the managed application to dedicate resources for the buffer, or reserving resources for the buffer that are not specific to the managed application or the driver.

8. The hardware computer-readable storage media of claim 1, wherein the creating also considers run time conditions in determining the buffering strategy.

9. A method, comprising:
dynamically matching an input/output request to a suitable driver; and,
determining a buffering strategy for accomplishing the input/output request based at least in part on information obtained from the driver,
wherein at least the determining is performed by a computing device.

10. The method of claim 9, wherein the dynamically matching comprises querying a datastructure with a namespace of the input/output request and responsively receiving an indication from the datastructure regarding the suitable driver for the namespace.

11. The method of claim 10, wherein the receiving comprises receiving an indication of a most suitable driver for the namespace.

12. The method of claim 9, further comprising reserving a buffer consistent with the buffering strategy.

13. The method of claim 12, wherein the reserving comprises causing a managed application that generated the input/output request to reserve the buffer.

14. The method of claim 9, further comprising causing data that corresponds to the input/output request to be transported over the driver.

15. A device, comprising:
a managed runtime component configured to define a data stream request naming convention for use by managed applications so that data stream requests from the managed applications include a namespace portion and an endpoint portion, and wherein the managed runtime component is configured to specify a driver naming convention that allows drivers to identify namespaces handled by the drivers so that suitable drivers can be selected to accomplish the data stream requests based upon the namespace portion; and
a hardware processor configured to execute the managed runtime component.

16. The device of claim 15, wherein the data stream request naming convention specifies that the namespace portion includes a transport identifier, a protocol identifier, or a protocol identifier and a transport identifier.

17. The device of claim 15, wherein the managed runtime component is configured to cause the drivers to self-register the namespaces.

18. The device of claim 17, further comprising a datastructure that stores the self-registered namespaces.

19. The device of claim 18, wherein the managed runtime component is further configured to query the datastructure to select the suitable drivers for the data stream requests.

20. The device of claim 19, wherein the managed runtime is further configured to obtain buffering strategies from the suitable drivers.

* * * * *